(12) United States Patent
Jin et al.

(10) Patent No.: US 10,942,949 B2
(45) Date of Patent: Mar. 9, 2021

(54) DATA PROCESSING METHOD AND APPARATUS FOR VIRTUAL RESOURCE

(71) Applicant: TENCENT TECHNOLOGY (SHENZHEN) COMPANY LIMITED, Shenzhen (CN)

(72) Inventors: Hongbo Jin, Shenzhen (CN); Huan Jin, Shenzhen (CN); Anqun Pan, Shenzhen (CN); Xiong Li, Shenzhen (CN); Wutong Jiang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 480 days.

(21) Appl. No.: 15/710,454

(22) Filed: Sep. 20, 2017

(65) Prior Publication Data
US 2018/0012302 A1    Jan. 11, 2018

Related U.S. Application Data

(63) Continuation of application No. PCT/CN2016/084176, filed on May 31, 2016.

(30) Foreign Application Priority Data

Aug. 20, 2015  (CN) .......................... 201510515781.2

(51) Int. Cl.
*G06F 16/20*  (2019.01)
*G06Q 20/40*  (2012.01)
(Continued)

(52) U.S. Cl.
CPC .......... *G06F 16/288* (2019.01); *G06F 16/148* (2019.01); *G06F 16/1767* (2019.01);
(Continued)

(58) Field of Classification Search
CPC ...................................................... G06Q 40/04
See application file for complete search history.

(56) References Cited

U.S. PATENT DOCUMENTS

| 2013/0060678 | A1 | 3/2013 | Oskolkov et al. |
| 2014/0279306 | A1* | 9/2014 | Shi .......................... G06Q 40/12 |
| | | | 705/30 |

FOREIGN PATENT DOCUMENTS

| CN | 103593799 | 2/2014 |
| CN | 103729474 | 4/2014 |

(Continued)

OTHER PUBLICATIONS

Internatonal Search Report dated Sep. 6, 2016 in PCT/CN2016/064176 filed May 31, 2016 (With English Translation).

*Primary Examiner* — Kristopher Andersen
(74) *Attorney, Agent, or Firm* — Oblon, McClelland, Maier & Neustadt, L.L.P.

(57) ABSTRACT

Aspects of the disclosure provide a data processing apparatus having interface circuitry and processing circuitry. The interface circuitry is configured to obtain data related to at least two resource accounts, and related to resource transfer of the at least two resource account. The processing circuitry configured to construct resource transfer relationships of the at least two resource accounts according to the data, calculate, based on the resource transfer relationships, similarity measurements between the at least two resource accounts according to a preset calculation rule, and output, according to the calculated similarity measurements, a resource account with a similarity measurement satisfying a preset condition.

15 Claims, 6 Drawing Sheets

(51) Int. Cl.
  *G06F 16/28*    (2019.01)
  *G06F 16/176*   (2019.01)
  *G06F 16/14*    (2019.01)
  *G06F 16/18*    (2019.01)
  G06F 16/10      (2019.01)
  G06Q 20/30      (2012.01)
  G06Q 20/38      (2012.01)
  G06Q 20/32      (2012.01)

(52) U.S. Cl.
  CPC ..... *G06F 16/1865* (2019.01); *G06Q 20/4014* (2013.01); *G06Q 20/3255* (2013.01); *G06Q 20/389* (2013.01); *G06Q 20/401* (2013.01); *G06Q 20/405* (2013.01)

(56) References Cited

FOREIGN PATENT DOCUMENTS

| | | |
|---|---|---|
| CN | 104348871 | 2/2015 |
| CN | 104504264 | 4/2015 |

\* cited by examiner

DATA PROCESSING METHOD AND APPARATUS FOR VIRTUAL RESOURCE

RELATED APPLICATION

This application is a continuation of International Application No. PCT/CN2016/084176, filed on May 31, 2016, which claims priority to Chinese Patent Application No. 201510515781.2, entitled "DATA PROCESSING METHOD AND APPARATUS FOR VIRTUAL RESOURCE" filed with the Chinese Patent Office on Aug. 20, 2015. The entire disclosures of the prior applications are hereby incorporated by reference herein in their entirety.

FIELD OF THE TECHNOLOGY

This application belongs to the field of electronic information technologies, and in particular, to a data processing method and apparatus for a virtual resource.

BACKGROUND OF THE DISCLOSURE

In relational networks such as a social network and a payment network, to better understand an association relationship between two property accounts, a similarity between the two accounts may be calculated. Currently, a frequently used method is: using a vector space model (VSM, vector space model) to perform a digital description on a feature vector extracted from each account, and then calculating a similarity by using a cosine similarity formula.

A feature vector extracted from each account is not obvious sometimes, and a large amount of empirical data is required for extracting a feature vector. Therefore, it is relatively difficult to provide a description by extracting a feature vector from each account. In addition, it is relatively complex to calculate a similarity between any two accounts in an entire property account system. As a result, consumption on a server is increased, and efficiency is not high.

SUMMARY

A data processing method and apparatus for a virtual resource disclosed in this application resolves the technical problem described in the BACKGROUND OF THE DISCLOSURE.

Aspects of the disclosure provide a data processing apparatus including interface circuitry and processing circuitry. The interface circuitry is configured to obtain data related to at least two resource accounts, and related to resource transfer of the at least two resource account. The processing circuitry is configured to construct resource transfer relationships of the at least two resource accounts according to the data, calculate, based on the resource transfer relationships, similarity measurements between the at least two resource accounts according to a preset calculation rule, and output, according to the calculated similarity measurements, a resource account with a similarity measurement satisfying a preset condition.

According to an aspect of the disclosure, the processing circuitry is configured to: set up commuting nodes respectively corresponding to the at least two resource accounts, set up secondary nodes respectively corresponding to services having resource transfer with the at least two resource accounts, configure edges between the computing nodes and the secondary nodes to be indicative of the resource transfer; and construct the resource transfer relationships according to the computing nodes, the secondary nodes, and the edges.

In an embodiment, the processing circuitry is configured to initialize a hop count, determine a target account from the at least two resource accounts, determine a direct association account that is in a direct resource transfer relationship with the target account, the direction resource transfer relationship having the initialized hop count between the target account and the direct association account, calculate, based on the resource transfer relationships, a direct similarity measurement between the target account and the direct association account according to the preset calculation rule, determine an indirect association account having an increased hop count to the target account via the direct association account, and calculate an indirect similarity measurement between the target account and the indirect association account based on the direct similarity measurement.

In an example, the processing circuitry is configured to determine, based on the resource transfer relationships, a first set of the secondary nodes having resource transfer with the target account and a second set of the secondary nodes having resource transfer with the direct association account, determine an intersection set of the first set of the secondary nodes and the second set of the secondary nodes, determine a union set of the first set of the secondary nodes and the second set of the secondary nodes, and calculate the direct similarity measurement between the target account and the direct association account according to a quantity ratio of the intersection set to the union set.

In another example, the processing circuitry is configured to determine, based on the resource transfer relationships, a first set of the secondary nodes having resource transfer in a direction with the target account and a second set of the secondary nodes having resource transfer in the direction with the direct association account, determine an intersection set of the first set of the secondary nodes and the second set of the secondary nodes, determine a union set of the first set of the secondary nodes and the second set of the secondary nodes, and calculate the direct similarity measurement between the target account and the direct association account according to a quantity ratio of the intersection set to the union set.

In another example, the processing circuitry is configured to determine common secondary nodes having resource transfer with both the target account and the direct association account, calculate a first total weight of a first weight sum between the target account and the common secondary nodes and a second weight sum between the direct association account and the common secondary nodes, calculate a second total weight of first weights between the target account and secondary nodes of the target account and second weights between the direct association account and secondary nodes of the direct association account, and calculate the direct similarity measurement between the target account and the direct association account according to a ratio of the first total weight to the second total weight.

In an embodiment, the target account has resource transfer to the indirect association account via the direct association account, and the processing circuitry is configured to calculate, based on the resource transfer relationships, a first similarity measurement between the direct association account and the indirect association account; and calculate the indirect similarity measurement between the target account and the indirect association account according to the direct similarity measurement and the first similarity measurement.

In another embodiment, the target account has a direct association with a first account and a second account, and an indirect association with the first account via the second account, and the processing circuitry is configured to calculate a first direct similarity measurement between the target account and the second account, calculate a second direct similarity measurement between the target account and the first account, calculate a third direct similarity measurement between the first account and the second account, and determine a similarity measurement between the target account and the first account according to a combination of the first direct similarity measurement, the second direct similarity measurement, and the third direct similarity measurement.

In an example, the processing circuitry is configured to compare a similarity measurement of an account with the target account with a threshold, and output, via the interface circuitry, the account and the similarity measurement when the similarity measurement is larger than the threshold.

Aspects of the disclosure provide a method for data processing by a data processing apparatus. The method includes obtaining, by circuitry of the data processing apparatus, data related to at least two resource accounts, and related to resource transfer of the at least two resource account, constructing resource transfer relationships of the at least two resource accounts according to the data, calculating, based on the resource transfer relationships, similarity measurements between the at least two resource accounts according to a preset calculation rule; and outputting, according to the calculated similarity measurements, a resource account with a similarity measurement satisfying a preset condition.

Aspects of the disclosure provide a non-transitory computer-readable medium storing instructions which when executed by a computer causes the computer to perform a method for data processing. The method includes obtaining, data related to at least two resource accounts, and related to resource transfer of the at least two resource account, constructing resource transfer relationships of the at least two resource accounts according to the data, calculating, based on the resource transfer relationships, similarity measurements between the at least two resource accounts according to a preset calculation rule; and outputting, according to the calculated similarity measurements, a resource account with a similarity measurement satisfying a preset condition.

BRIEF DESCRIPTION OF THE DRAWINGS

The following describes specific implementations of this application in detail with reference to the accompanying drawings, which makes the technical solutions of this application and other beneficial effects obvious.

DESCRIPTION OF EMBODIMENTS

Figure 1A:
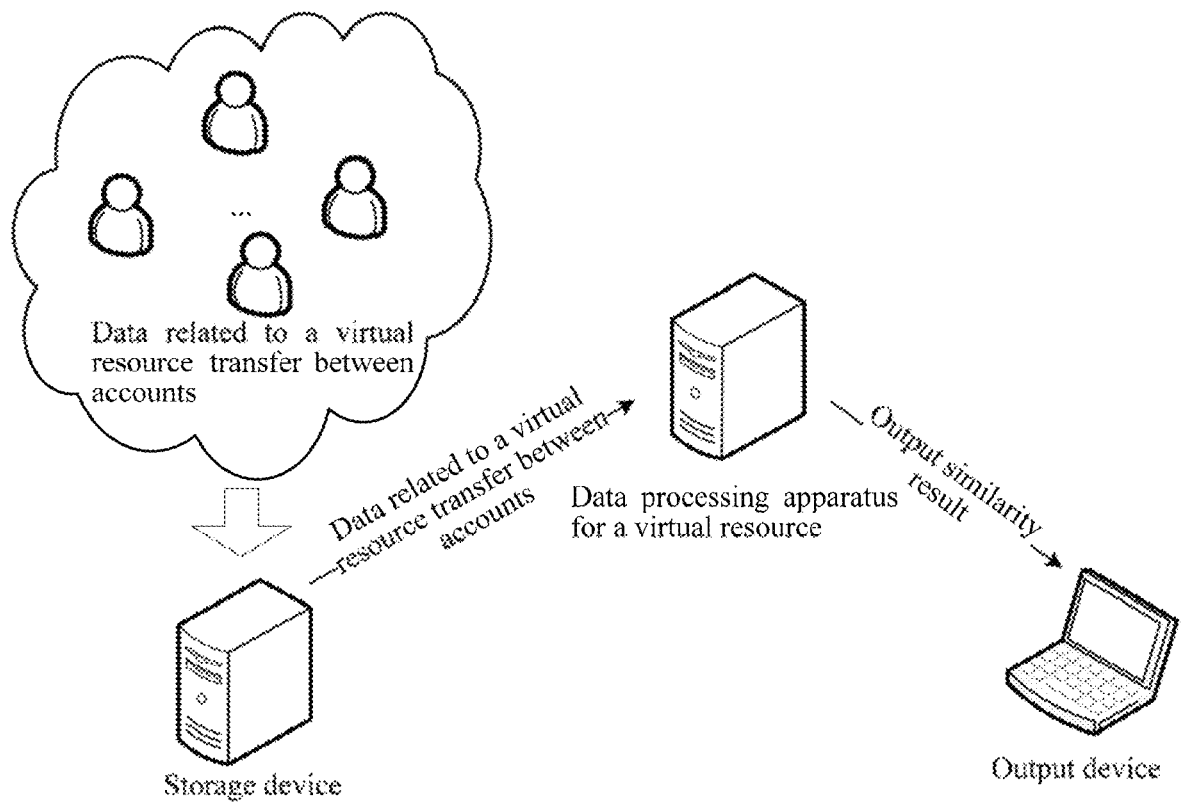
FIG. 1a is a schematic scenario diagram of a data processing system for a virtual resource according to this application.

Referring to the drawings, same component symbols represent same components. A principle of this application is described by using an example in which a suitable computing environment is used for implementation. The following descriptions are based on specific exemplified embodiments of this application, and shall not construed as a limit to other specific embodiments of this application that are not detailed herein.

In the following descriptions, the specific embodiments of this application are described with reference to steps performed by one or more computers and symbols, unless otherwise specified. Therefore, it may be mentioned for several times that these steps and operations are performed by a computer. The computer described in this specification performs an operation that is performed by a processing unit of a computer that processes structured data in the form of electrical signals. According to the operation, the data is converted or is maintained at a position in a memory system of the computer. Operating of the computer may be changed after the operation is reconfigured or in a manner known to a person skilled in the art. The data in a maintained data structure of the data is stored at a physical position of the memory. The data has a particular characteristic defined by the data format. However, the foregoing content is for describing the principle of this application, and does not represent a limitation. A person skilled in the art may understand that multiple steps and operations described below may also be implemented by using hardware.

Many other general-purpose or specific-purpose operations, communications environments, or configurations may be used to implement the principle of this application. Examples that are applicable to a computing system, an environment, and a configuration of this application may include (but are not limited to) a portable telephone, a personal computer, a server, a multi-processor system, a microcomputer-based system, a mainframe computer, and a distributed computing environment including any system or apparatus described above.

In the technical solutions disclosed in this application, data related to a virtual resource transfer between multiple virtual resource accounts is obtained, a virtual resource transfer relationship chain between the virtual resource accounts is constructed according to the data, a similarity between the virtual resource accounts is calculated according to the virtual resource transfer relationship chain and a preset calculation rule, and a corresponding similarity and a virtual resource account that satisfies a preset condition are output. That is, independent virtual resource transfer data of each virtual resource account is analyzed to construct a virtual resource transfer relationship chain, so that a similarity may be calculated by using an association relationship between the accounts. This, compared with a manner of calculating a similarity by extracting a feature vector from each account, can significantly reduce a calculated amount for the similarity, thereby reducing consumption of a server and improving efficiency.

The embodiments of this application provide a data processing method and apparatus for a virtual resource.

Referring to FIG. 1a, FIG. 1a is a schematic scenario diagram of a data processing system for a virtual resource according to an embodiment of this application. The data processing system may include a data processing apparatus for a virtual resource, which may be referred to as a virtual resource processing apparatus for short, and is mainly configured to: obtain data related to a virtual resource transfer between multiple virtual resource accounts; construct a virtual resource transfer relationship chain according to the data related to the resource transfer, for example, constructing a property transfer relationship chain according to data related to bank transfers and payment by account, virtual currency recharging, and or the like; then, calculate, based on the virtual resource transfer relationship chain, a similarity between the virtual resource accounts according to a preset calculation rule; and output, according to the calculated similarity, a corresponding similarity and a virtual resource account that satisfies a preset condition. For example, an output similarity result may be set to outputting a similar account of which a similarity is greater than a threshold and the similarity of the account, or outputting N (N is a positive integer) similar accounts of which similarities rank first and the similarities of the accounts.

In addition, the data processing system may further include a storage device, mainly configured to provide, to the virtual resource processing apparatus according to a requirement of a user, a virtual resource account that satisfies the requirement and data related to a virtual resource transfer. Certainly, the data processing system may further include an output device, configured to receive an output similarity result that is from the virtual resource processing apparatus, and display the output result or use the output result, for example, using the output result to find a shadow account.

The following provides detailed descriptions separately.

In an embodiment, a description is provided from the perspective of a data processing apparatus for a virtual resource. The data processing apparatus for a virtual resource may be specifically integrated in a network device such as a server or a gateway.

A data processing method for a virtual resource includes: obtaining data related to a virtual resource transfer between at least two virtual resource accounts; constructing a virtual resource transfer relationship chain between the virtual resource accounts according to the data related to the resource transfer; calculating, based on the virtual resource transfer relationship chain, a similarity between the virtual resource accounts according to a preset calculation rule; and outputting, according to the calculated similarity, a corresponding similarity and a virtual resource account that satisfies a preset condition.

Figure 1B:
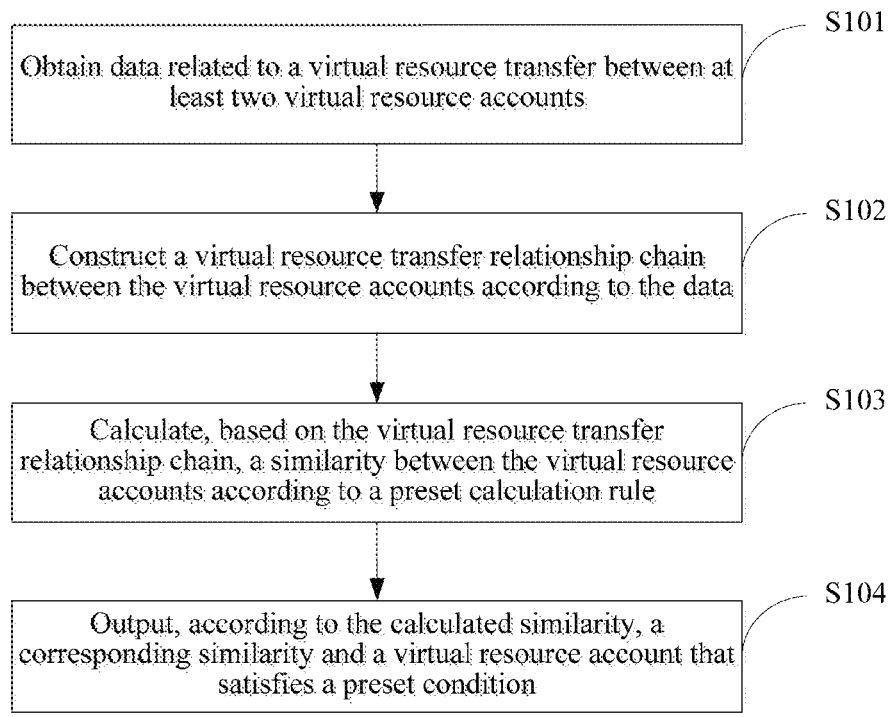
FIG. 1b is a schematic flowchart of a data processing method for a virtual resource according to an embodiment of this application.

Referring to FIG. 1b, FIG. 1b is a schematic flowchart of a data processing method for a virtual resource according to an embodiment of this application. A specific process may include the following steps:

Step S101: Obtain data related to a virtual resource transfer between at least two virtual resource accounts.

In this embodiment, an account hosting products such as Q coins and Q points, bills, and game props and services that are bought by a user is referred to as a virtual resource account. In a relational network such as a social network or a payment network, all of bank transfers and payment by account, virtual currency (for example, Q coins) recharging, purchase of an entertainment item (for example, QQ game props), or payment for an application service (for example, account upgrade or membership application) may be considered as data related to a virtual resource transfer between virtual resource accounts.

Step S102: Construct a virtual resource transfer relationship chain between the virtual resource accounts according to the data.

For example, the step of constructing a virtual resource transfer relationship chain between the virtual resource accounts according to the data related to the virtual resource transfer may be as follows:

(1) Determine a corresponding virtual resource account as a computing node according to an instruction in the data related to the virtual resource transfer.

(2) Determine a service node having a virtual resource transfer association with the virtual resource account as a secondary node.

Figure 1C:
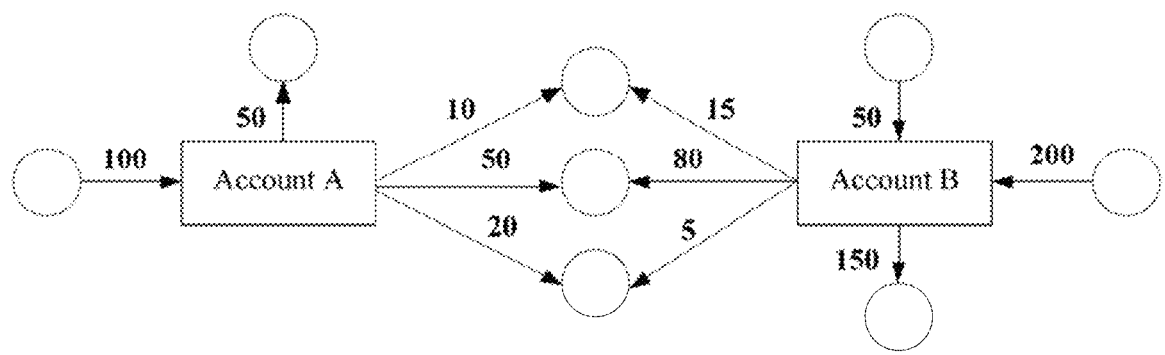
FIG. 1c is a schematic diagram of a virtual resource transfer relationship chain between virtual resource accounts according to this application.

It may be understood that referring to FIG. 1c, FIG. 1c shows a virtual resource transfer relationship chain between two virtual resource accounts. The virtual resource transfer relationship chain is also referred to as a relationship chain network, and is a network including an interconnection relationship between association nodes. For example, the virtual resource transfer relationship chain may be specifically a property transfer relationship chain, and is used for representing a property transfer relationship such as purchase or presentation between virtual property accounts.

First, a virtual resource account A (which may be referred to as an account A for short) and an account B are determined as computing nodes, and are represented by square frames. Service nodes having a virtual resource transfer association with the account A and the account B are determined as secondary node, and are represented by circle frames. For example, if the account A and the account B are defined as QB accounts, a monetary channel node, a game node, a monthly service node, and the like having a virtual resource transfer association with the accounts are determined as secondary nodes.

(3) Determine an edge between the computing node and the secondary node, the edge indicating a direction and a weight of a virtual resource transfer.

(4) Constructing a virtual resource transfer relationship chain according to the computing node, the secondary node, and the edge.

After the computing node and the secondary node are determined, the edge between the computing node and the secondary node is determined, where the edge may indicate a property transfer. An arrow of the edge represents the direction (including an inflow and an outflow) of the virtual resource transfer, and the weight of the edge represents an amount of transferred property or a quantity of property transfers. Finally, a directed graph (for example, FIG. 1c) may be constructed by using the computing node, the secondary node, and the edge according to a property transfer direction. In this embodiment, the directed graph is referred to as the virtual resource transfer relationship chain.

Step S103: Calculate, based on the virtual resource transfer relationship chain, a similarity between the virtual resource accounts according to a preset calculation rule.

Before the calculating, based on the virtual resource transfer relationship chain, a similarity between the virtual resource accounts according to a preset calculation rule, the method may further include the following steps:

(a) Initialize a node hop count between the virtual resource accounts.

(b) Determine a target virtual account in the virtual resource accounts.

(c) Obtain a direct association account that is in a direct virtual resource transfer association with the target virtual account.

For example, after a virtual resource transfer relationship chain is constructed, a similarity obtaining request input by a user is received; in obtained virtual resource accounts, a target virtual account specified by the user is determined according to the request; and a similarity between the target virtual account and an association account is calculated according to the virtual resource transfer relationship chain, so as to find an association account having a higher similarity with the target virtual account.

In this case, the calculating, based on the virtual resource transfer relationship chain, a similarity between the virtual resource accounts according to a preset calculation rule may specifically include:

(A) Calculate, based on a relationship chain between the target virtual account and the direct association account, a similarity between the target virtual account and the direct association account according to the preset calculation rule, to obtain a direct similarity.

(B) Progressively increase the node hop count between the virtual resource accounts.

(C) When it is determined that a value of a node hop count obtained after the progressive increase is less than a preset threshold, obtain a corresponding first association account according to the value of the node hop count obtained after the progressive increase.

(D) Calculate a similarity between the target virtual account and the first association account according to the direct similarity, and trigger the step of progressively increasing the node hop count between the virtual resource accounts, until a value of a node hop count obtained after the progressive increase reaches the preset threshold.

Step (A) to step (D) are a processing process of calculating a similarity between the target virtual account and an account that is n (n is a positive integer greater than 0) hops away from the target virtual account After the virtual resource transfer (for example, property transfer) relationship chain is constructed, an initialization operation of setting a hop count to 0 is performed. After the similarity between the target virtual account and the direct association account is calculated, the hop count is updated, and a similarity result is output after the hop count reaches the preset threshold.

It may be understood that in an example of a property transfer, a basic idea of similarity calculation is that more associated property between two virtual property accounts indicate a larger similarity between the accounts. A value of the similarity ranges from 0 to 1, 0 indicates being totally not similar, and 1 indicates being totally similar.

Steps of calculating a similarity may specifically include the following cases:

In step (A), the similarity between the target virtual account and the direct association account is calculated. That is, a direct similarity between two directly associated accounts is calculated. In addition, the direct similarity between the two directly associated accounts may be calculated by using many methods, and details may be specifically as follows:

Case 1: For example, a similarity calculation rule in this case may be set as calculating a similarity without considering the weight of the edge. The following steps are included: determining, based on the relationship chain between the target virtual account and the direct association account, an intersection set of a set of secondary nodes of the target virtual account and a set of secondary nodes of the direct association account, and a union set of the set of the secondary nodes of the target virtual account and the set of the secondary nodes of the direct association account; and determining the similarity between the target virtual account and the direct association account according to a quantity of nodes in the intersection set and a quantity of nodes in the union set, to obtain the direct similarity.

Case 2: For another example, based on Case 1, a direction condition may be considered when a secondary node associated with an account is extracted. The following steps are included: determining, based on a direction of a virtual resource transfer indicated by the relationship chain between the target virtual account and the direct association account, an intersection set of a set of secondary nodes that are in the same transfer direction and that are of the target virtual account and a set of secondary nodes that are in the same transfer direction and that are of the direct association account, and a union set of the set of the secondary nodes that are in the same transfer direction and that are of the target virtual account and the set of the secondary nodes that are in the same transfer direction and that are of the direct association account; and determining the similarity between the target virtual account and the direct association account according to a quantity of nodes in the intersection set and a quantity of nodes in the union set, to obtain the direct similarity.

Case 3: For still another example, a similarity calculation rule in this case may be set as calculating a similarity by considering the weight of the edge. The following steps are included: determining, based on the relationship chain between the target virtual account and the direct association account, a common secondary node of the target virtual account and the direct association account;

obtaining a first total weight according to a weight between the target virtual account and the common secondary node and a weight between the direct association account and the common secondary node; and obtaining a second total weight according to a weight between the target virtual account and a secondary node corresponding to the target virtual account and a weight between the direct association account and a secondary node corresponding to the direct association account; and determining the similarity between the target virtual account and the direct association account according to the first total weight and the second total weight, to obtain the direct similarity.

It may be understood that based on Case 3, a direction condition may also be limited when a secondary node is extracted. For details, refer to Case 2, and details are not described herein again.

Further, in step (D), the similarity between the target virtual account and the first association account is calculated according to the direct similarity. That is, a similarity between the target virtual account and a first association account between which a hop count exists. Details may be specifically as follows:

For example, in an implementation, the similarity may be calculated by using a similarity propagation algorithm. That is, two accounts may be in a property association with another account to generate similarity propagation. Specifically, the target virtual account is in a virtual resource transfer association with the first association account by using the direct association account, and the calculating a similarity between the target virtual account and the first association account according to the direct similarity may specifically include:

calculating, based on a relationship chain between the direct association account and the first association account, a similarity between the direct association account and the corresponding first association account, to obtain a first similarity; and calculating the similarity between the target virtual account and the first association account according to the direct similarity and the first similarity.

For another example, in an implementation, the similarity may be calculated by using a similarity overlap and add algorithm. That is, two accounts may be associated by using multiple methods, and similarities generated by using the methods may be overlapped and added to serve as a final similarity between the two accounts. Specifically, the direct association account includes the first association account (that is, the corresponding first association account obtained according to the value of the node hop count obtained after the progressive increase) and a second association account, the target virtual account is in a virtual resource transfer association with the first association account by using the second association account, and the target virtual account is in a direct virtual resource transfer association with the first association account; and the calculating a similarity between the target virtual account and the first association account according to the direct similarity may include:

determining a direct similarity between the target virtual account and the second association account as a first direct similarity, and determining a direct similarity between the target virtual account and the first association account as a second direct similarity; and calculating, based on a relationship chain between the second association account and the first association account, a similarity between the second association account and the first association account, to obtain a third direct similarity, and determining the similarity between the target virtual account and the first association account according to the first direct similarity, the second direct similarity, and the third direct similarity.

Step S104: Output, according to the calculated similarity, a corresponding similarity and a virtual resource account that satisfies a preset condition.

It may be understood that the outputting, according to the calculated similarity, a corresponding similarity and a virtual resource account that satisfies a preset condition may specifically include:

for example, determining, according to the calculated similarity, an association account corresponding to a similarity that is between the association account and the target virtual account and that is greater than a preset similarity, and outputting the association account and the corresponding similarity; or for another example, arranging the similarity in a descending order, determining, based on the arrangement, an association account satisfying a preset arrangement range, and outputting the association account and a corresponding similarity, for example, outputting N association accounts of which similarities rank first and the similarities of the accounts.

It can be learned from the foregoing descriptions that according to the data processing method for a virtual resource provided in this embodiment, data related to a virtual resource transfer between multiple virtual resource accounts is obtained, a virtual resource transfer relationship chain between the virtual resource accounts is constructed according to the data, a similarity between the virtual resource accounts is calculated according to the virtual resource transfer relationship chain and a preset calculation rule, and a corresponding similarity and a virtual resource account that satisfies a preset condition are output. Independent virtual resource transfer data of each virtual resource account is analyzed to construct a virtual resource transfer relationship chain, so that a similarity may be calculated by using an association relationship between the accounts. This, compared with a manner of calculating a similarity by extracting a feature vector from each account, can significantly reduce a calculated amount for the similarity, thereby reducing consumption of a server and improving efficiency. Further, a searching range of a similar account is purposely extended by using propagation and additivity of a similarity, to obtain a more accurate calculation result.

Detailed descriptions are provided in the following by using an example according to the method described in the foregoing embodiment.

Figure 2A:
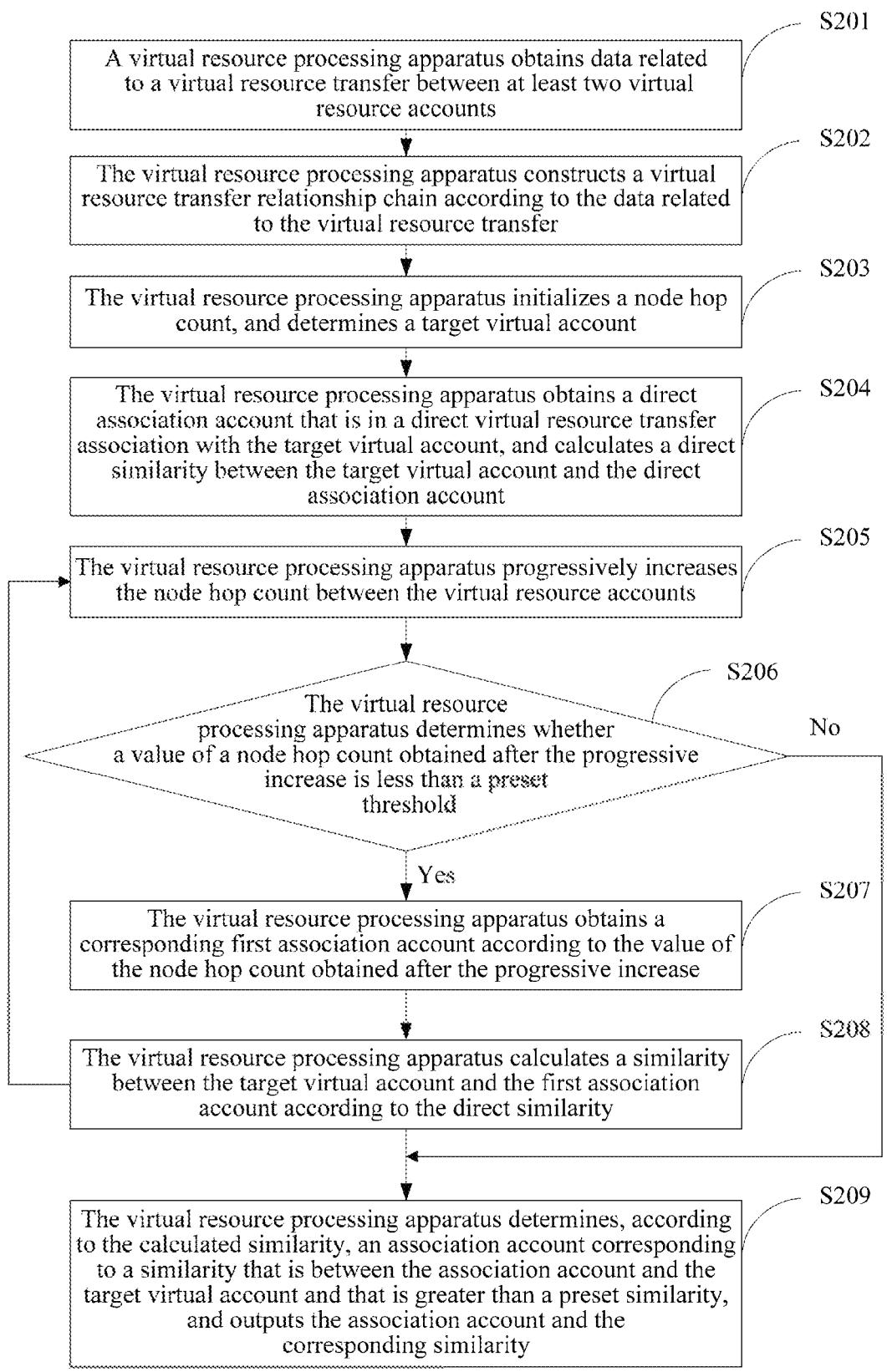
FIG. 2a is another schematic flowchart of a data processing method for a virtual resource according to an embodiment of this application.

Referring to FIG. 2a, FIG. 2a is a schematic flowchart of a data processing method for a virtual resource according to another embodiment of this application. This embodiment is described from the perspective of a virtual resource processing apparatus. In this embodiment, a virtual resource transfer may be specifically a property transfer by account. A specific process may include the following steps:

Step S201: The virtual resource processing apparatus obtains data related to a virtual resource transfer between at least two virtual resource accounts.

Step S202: The virtual resource processing apparatus constructs a virtual resource transfer relationship chain according to the data related to the virtual resource transfer.

Step S201 and step S202 may specifically include the following steps:

For example, as shown in FIG. 1c, data related to a virtual resource transfer (for example, a property transfer) between a virtual resource account A (which is referred to as an account A for short) and an account B is obtained, and a property transfer relationship chain between the account A and the account B is constructed.

Figure 2B:
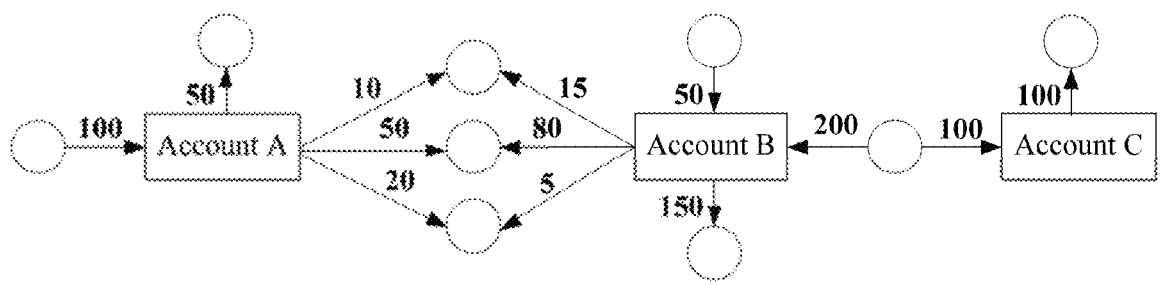
FIG. 2b is another schematic diagram of a virtual resource transfer relationship chain between virtual resource accounts according to this application.
Figure 2C:
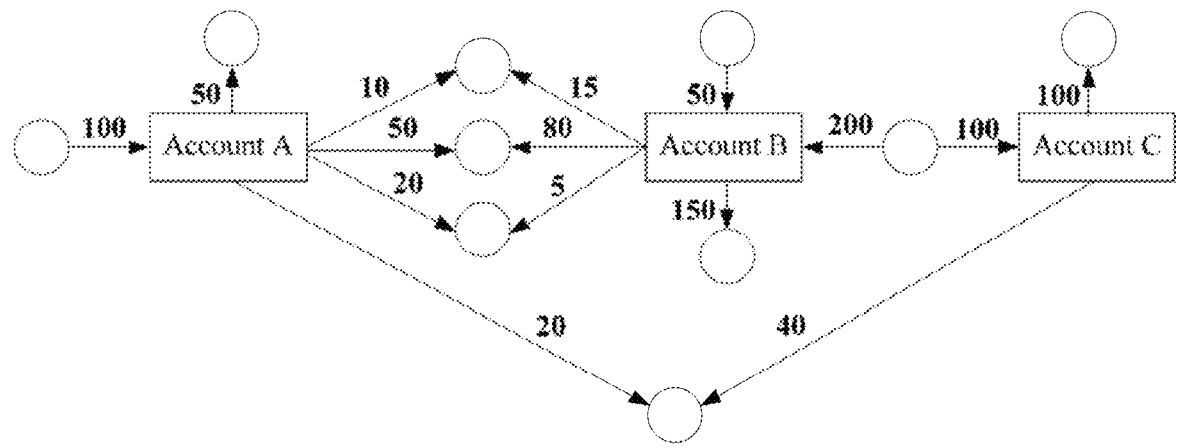
FIG. 2c is still another schematic diagram of a virtual resource transfer relationship chain between virtual resource accounts according to this application.

For another example, as shown in FIG. 2b and FIG. 2c, data related to a property transfer between an account A, an account B, and an account C is obtained, and a property transfer relationship chain between the account A, the account B, and the account C is constructed.

It may be understood that all of bank transfers and payment by account, virtual currency (for example, Q coins) recharge, purchase of an entertainment item (for example, QQ game props), or payment for an application service (for example, account upgrade or membership application) may be considered as data related to a virtual resource transfer between virtual resource accounts. The data is not specifically limited herein.

Further, the constructing a virtual resource transfer relationship chain may be specifically as follows:

As shown in FIG. 1c, a virtual resource account A (which may be referred to as an account A for short) and an account B are determined as computing nodes, and are represented by square frames. Service nodes having a virtual resource transfer association with the account A and the account B are determined as secondary node, and are represented by circle frames. For example, if the account A and the account B are defined as QB accounts, a monetary channel node, a game node, a monthly service node, and the like having a virtual resource transfer association with the accounts are determined as secondary nodes.

After the computing node and the secondary node are determined, the edge between the computing node and the secondary node is determined, where the edge may indicate a property transfer. An arrow of the edge represents the direction (including an inflow and an outflow) of the virtual resource transfer, and the weight of the edge represents an amount of transferred property or a quantity of property transfers. Finally, the virtual resource transfer relationship chain may be constructed by using the computing node, the secondary node, and the edge according to a property transfer direction, to represent a property transfer relationship such as purchase or presentation between virtual property accounts.

Step S203: The virtual resource processing apparatus initializes a node hop count, and determines a target virtual account.

For example, after the virtual resource transfer (for example, property transfer) relationship chain is constructed, an initialization operation of setting a hop count to 0 is performed; a similarity obtaining request input by a user is received; and in obtained virtual resource accounts, a target virtual account specified by the user is determined according to the request. In this embodiment, the account A is determined as the target virtual account, to find an association account having a higher similarity with the account A.

Step S204: The virtual resource processing apparatus obtains a direct association account that is in a direct virtual resource transfer association with the target virtual account, and calculates a direct similarity between the target virtual account and the direct association account.

It may be understood that in an example of a property transfer, a basic idea of similarity calculation is that more associated property between two virtual property accounts indicate a larger similarity between the accounts. A value of the similarity ranges from 0 to 1, 0 indicates being totally not similar, and 1 indicates being totally similar.

A similarity between two directly associated accounts may also be calculated by using multiple methods. Details may be specifically as follows:

(1) A similarity calculation rule is set as calculating a similarity without considering the weight of the edge:

Specifically, an intersection set of a set of secondary nodes of the target virtual account and a set of secondary nodes of the direct association account, and a union set of the set of the secondary nodes of the target virtual account and the set of the secondary nodes of the direct association account are determined based on the relationship chain between the target virtual account and the direct association account; and the similarity between the target virtual account and the direct association account is determined according to a quantity of nodes in the intersection set and a quantity of nodes in the union set, to obtain the direct similarity.

Further, a value of a numerator is a quantity of common secondary nodes between two accounts, and a value of a denominator is a quantity of secondary nodes between the two accounts. If a secondary node associated with an account is considered as a node set, a similarity between the two accounts is equal to a ratio of an intersection set of secondary node sets of the two accounts to a union set of the secondary node sets of the two accounts.

For example, as shown in FIG. 1c, the account B is in a direct virtual resource transfer association with the account A. A direct similarity between the account A and the account B is equal to $3/8$.

For another example, as shown in FIG. 2b, the account B is also in a direct virtual resource transfer association with the account A. A direct similarity between the account A and the account B is equal to $3/8$.

For still another example, as shown in FIG. 2c, the account B and the account C are in a direct virtual resource transfer association with the account A. A direct similarity between the account A and the account B is equal to $3/8$, and a direct similarity between the account A and the account C is equal to $1/8$.

(2) A similarity calculation rule is set as calculating a similarity by considering a direction of the edge but not considering the weight of the edge but:

Specifically, an intersection set of a set of secondary nodes that are in the same transfer direction and that are of the target virtual account and a set of secondary nodes that are in the same transfer direction and that are of the direct association account, and a union set of the set of the secondary nodes that are in the same transfer direction and that are of the target virtual account and the set of the secondary nodes that are in the same transfer direction and that are of the direct association account are determined based on a direction of a virtual resource transfer indicated by the relationship chain between the target virtual account and the direct association account; and the similarity between the target virtual account and the direct association account is determined according to a quantity of nodes in the intersection set and a quantity of nodes in the union set, to obtain the direct similarity.

Further, for example, a secondary node from which a virtual resource flows out is extracted. That is, a node on which assets are consumed is focused.

As shown in FIG. 1c, the account A has four secondary node sets that satisfy a requirement, and the account B has four secondary node sets that satisfy a requirement. In this case, a direct similarity between the account A and the account B is equal to $3/5$.

(3) A similarity calculation rule is set as calculating a similarity by considering the weight of the edge:

Specifically, a common secondary node of the target virtual account and the direct association account is determined based on the relationship chain between the target virtual account and the direct association account; a first total weight is obtained according to a weight between the target virtual account and the common secondary node and a weight between the direct association account and the common secondary node; a second total weight is obtained according to a weight between the target virtual account and a secondary node corresponding to the target virtual account and a weight between the direct association account and a secondary node corresponding to the direct association account; and the similarity between the target virtual account and the direct association account is determined according to the first total weight and the second total weight, to obtain the direct similarity.

Further, a value of a numerator is a total amount of property transferred between each account and the common secondary node that is between the two accounts, and a value of a denominator is a total amount of property transferred between the two accounts.

For example, as shown in FIG. 1c, a direct similarity between the account A and the account B is equal to $(80+100)/(230+500)=180/730=18/73$.

(4) A similarity calculation rule is set as calculating a similarity by considering both the weight of the edge and a direction of the edge:

It may be understood that based on calculation of the direct similarity in (3), a direction condition may also be limited when a secondary node is extracted. For detailed calculations, refer to similarity calculation in (2), and details are not described herein again.

Step S205: The virtual resource processing apparatus progressively increases the node hop count between the virtual resource accounts.

In this embodiment, after the similarity between the account A and the direct association account is calculated, the node hop count between the virtual resource accounts is added by 1. For example, an original node hop count is 0, and an updated node hop count is 1.

Step S206: The virtual resource processing apparatus determines whether a value of a node hop count obtained after the progressive increase is less than a preset threshold.

The following steps are separately performed according to a determining result.

When it is determined that the value of the node hop count obtained after the progressive increase is less than the preset threshold, step S207 is performed. When it is determined that the value of the node hop count obtained after the progressive increase reaches the preset threshold, step S209 is performed.

Step S207: The virtual resource processing apparatus obtains a corresponding first association account according to the value of the node hop count obtained after the progressive increase.

Step S208: The virtual resource processing apparatus calculates a similarity between the target virtual account and the first association account according to the direct similarity.

It may be understood that after the similarity between the target virtual account and the first association account is calculated, and step S205 (progressively increasing the node hop count between the virtual resource accounts) is triggered to be performed, until a value of a node hop count obtained after the progressive increase reaches the preset threshold.

Step S205 to step S208 are a processing process of calculating a similarity between the target virtual account (the account A) and an account that is n (n is a positive integer greater than 0) hops away from the target virtual account. After the virtual resource transfer (for example, property transfer) relationship chain is constructed, an initialization operation of setting a hop count to 0 is performed. After the similarity between the target virtual account and the direct association account is calculated, the hop count is updated, and a similarity result is output after the hop count reaches the preset threshold.

To calculate the similarity between the target virtual account and the first association account according to the direct similarity, the similarity calculation rule may be specifically determined according to a transfer relationship chain between the virtual resource accounts.

In an implementation, the similarity may be calculated by using a similarity propagation algorithm. That is, two accounts may be in a property association with another account to generate similarity propagation.

Assuming that the target virtual account is in a virtual resource transfer association with the first association account by using the direct association account, the calculating a similarity between the target virtual account and the first association account according to the direct similarity may specifically include:

Step 1: Calculate, based on a relationship chain between the direct association account and the first association account, a similarity between the direct association account and the corresponding first association account, to obtain a first similarity.

Step 2: Calculate the similarity between the target virtual account and the first association account according to the direct similarity and the first similarity.

For example, as shown in FIG. 2b, if the preset threshold is 2, it may be determined that the first association account corresponding to the target virtual account is the account C, and the account A is in a property transfer association with the account C by using the account B (the direct association account). Therefore, a similarity between the account A and the account C is sim(A,C)=sim(A,B)*sim(B,C).

Sim(A,B) represents a similarity between the account A and the account B (that is, the direct similarity between the account A and the account B in this embodiment), and sim(B,C) represents a similarity between the account B and the account C (that is, a direct similarity between the account B and the account C, that is, the first similarity described above). It is easily figured out that the similarity is calculated with reference to the foregoing described formula for calculating a similarity between two accounts. Details are not described herein again.

In another implementation, the similarity may be calculated by using a similarity overlap and add algorithm. That is, two accounts may be associated by using multiple methods, and similarities generated by using the methods may be overlapped and added to serve as a final similarity between the two accounts.

Assuming that the direct association account includes the first association account (that is, the corresponding first association account obtained according to the value of the node hop count obtained after the progressive increase) and a second association account (an account that is in a direct association with the target virtual account), the target virtual account is in a virtual resource transfer association with the first association account by using the second association account, and the target virtual account is in a direct virtual resource transfer association with the first association account, the calculating a similarity between the target virtual account and the first association account according to the direct similarity may specifically include:

Step a: Determine a direct similarity between the target virtual account and the second association account as a first direct similarity.

Step b: Determine a direct similarity between the target virtual account and the first association account as a second direct similarity.

Step c: Calculate, based on a relationship chain between the second association account and the first association account, a similarity between the second association account and the first association account, to obtain a third direct similarity.

Step d: Determine the similarity between the target virtual account and the first association account according to the first direct similarity, the second direct similarity, and the third direct similarity.

For example, as shown in FIG. 2c, if the preset threshold is 2, it may be determined that the first association account corresponding to the target virtual account is the account C, and in addition to that the account A is in an association with the account C by using the account B (the second association account), the account A is also in a direct transfer association with the account C. Therefore, a similarity between the account A and the account C is sim(A,C)=sim1(A,C)+sim2(A,C)=sim(A,B)*sim(B,C)+sim2(A,C).

Sim1(A,C) represents a similarity calculated according to the association between the account A and the account C by means of the intermediate account B (that is, a similarity calculated according to the first direct similarity and the third direct similarity), and sim2(A,C) represents a similarity calculated according to the direct association between the account A and the account C (that is, the second direct similarity). It is easily figured out that the similarity is calculated with reference to the foregoing described formula for calculating a similarity between two accounts. Details are not described herein again.

Step S209: The virtual resource processing apparatus determines, according to the calculated similarity, an association account corresponding to a similarity that is between the association account and the target virtual account and that is greater than a preset similarity, and outputs the association account and the corresponding similarity.

It may be understood that in some implementations, the similarity may further be arranged in a descending order; then, an association account satisfying a preset arrangement range is determined based on the arrangement; and the association account and a corresponding similarity are output, for example, outputting N association accounts of which similarities rank first and the similarities of the accounts.

It can be learned from the foregoing descriptions that according to the data processing method for a virtual resource provided in this embodiment, data related to a virtual resource transfer between multiple virtual resource accounts is obtained, a virtual resource transfer relationship chain between the virtual resource accounts is constructed according to the data, a similarity between the virtual resource accounts is calculated according to the virtual resource transfer relationship chain and a preset calculation rule, and a corresponding similarity and a virtual resource account that satisfies a preset condition are output. Independent virtual resource transfer data of each virtual resource account is analyzed to construct a virtual resource transfer relationship chain, so that a similarity may be calculated by using an association relationship between the accounts. This, compared with a manner of calculating a similarity by extracting a feature vector from each account, can significantly reduce a calculated amount for the similarity, thereby reducing consumption of a server and improving efficiency. Further, a searching range of a similar account is purposely extended by using propagation and additivity of a similarity, to obtain a more accurate calculation result.

To better understand the technical solution of this application, the following uses specific application examples to described the solution.

Figure 2D:
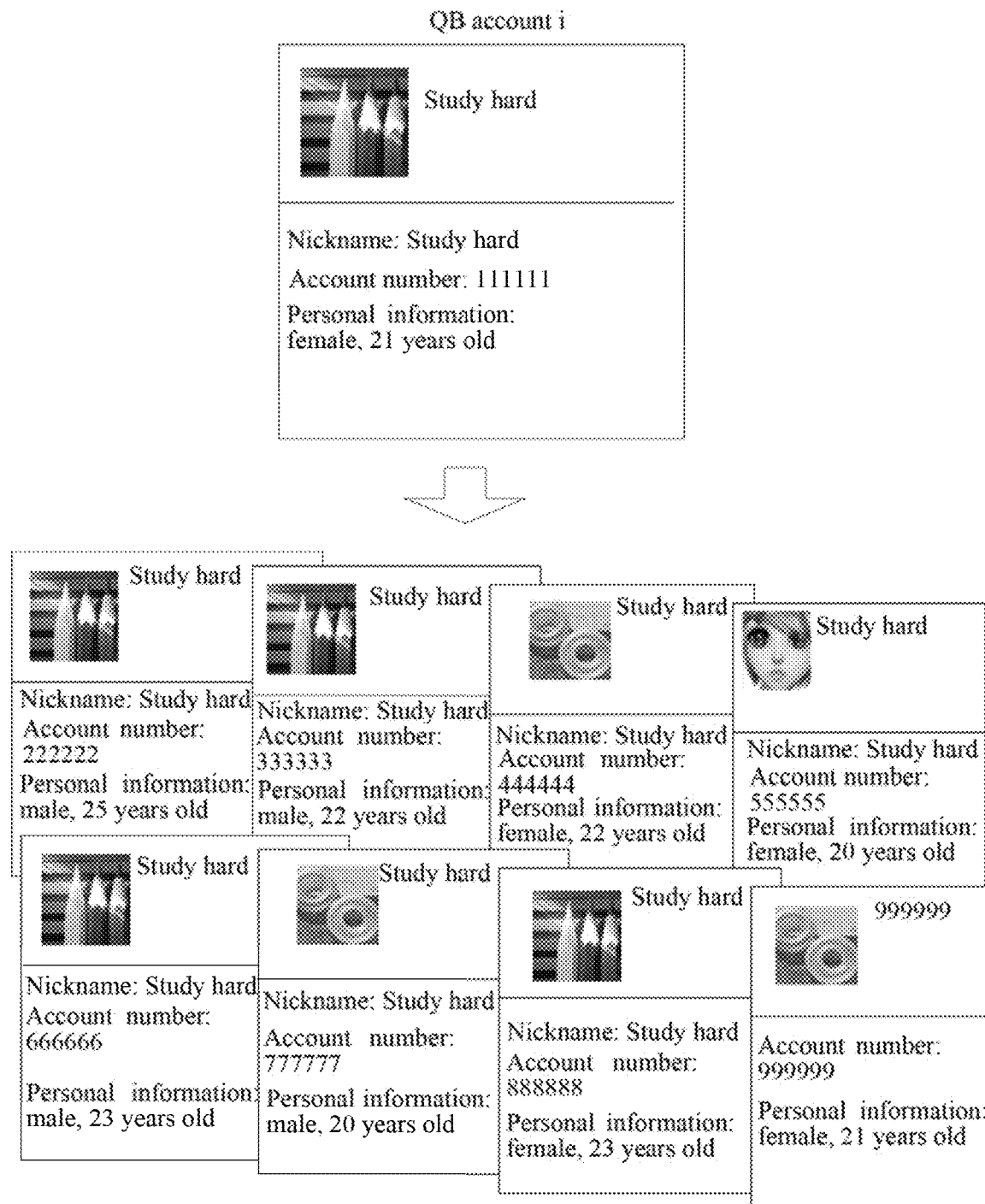
FIG. 2d is a schematic diagram of an application example of a data processing method for a virtual resource according to this application.

For example, the data processing method for a virtual resource may be used for determining another QB account associated with a specified QB account. As shown in FIG. 2d, it is assumed that a QB account i is specified. Statistics about data related to a transaction record within a preset time period (for example, half a month or a month) are collected, to determine, according to the data, most similar QB accounts that are one hop away from the account i by using the data processing method for a virtual resource. Then, after similarities are calculated, the first eight QB accounts having higher similarities are verified by using descriptions about QQ nicknames. It can be found through verification that among the eight similar QB accounts, descriptions about QQ nicknames of seven QB accounts have higher similarities with that of the specified account i. In this way, through verification, it can show that accuracy of obtaining a similar account is relatively high. It is noted that an important application of the example is to search for a shadow account of a given QB account. The shadow account refers to that multiple accounts are possessed by a same person. That is, one user has multiple virtual property accounts. There is a similar transaction behavior between the accounts, and an illegal property transfer operation is usually performed. Therefore, the method may be used for finding a similar shadow account, improving transaction security, and so on.

Still further, the shadow accounts are generally malicious property accounts possessed by a malicious user. Therefore, considering there are generally many secondary nodes associated with the malicious property accounts (for example, a behavior such as recharging or phishing fraud), to prevent a normal user from being interfered, a quantity of common secondary nodes between two virtual accounts or a quantity of associated secondary nodes of a single account may be set to be greater than a threshold. Then, a similarity is calculated, thereby further reducing consumption on a server and improving efficiency.

For another example, an existing process of modeling a suspicious and malicious account has a serious problem of lacking training samples, especially lacking malicious samples. This application may further be extended to resolve the problem of a lack of samples. For example, initial samples of some suspicious and malicious accounts are collected by means of customer complaints or questionnaires, and then a similarity is calculated according to transaction behavior data with reference to the data processing method for a virtual resource, so as to find other similar accounts and increase a quantity of training samples by using the similar accounts.

To better implement the data processing method for a virtual resource provided in the embodiments of this application, an embodiment of this application further provides an apparatus based on the data processing method for a virtual resource. Meanings of nouns are the same of those in the data processing method for a virtual resource. For specific implementation details, refer to the descriptions in the method embodiments.

Figure 3:
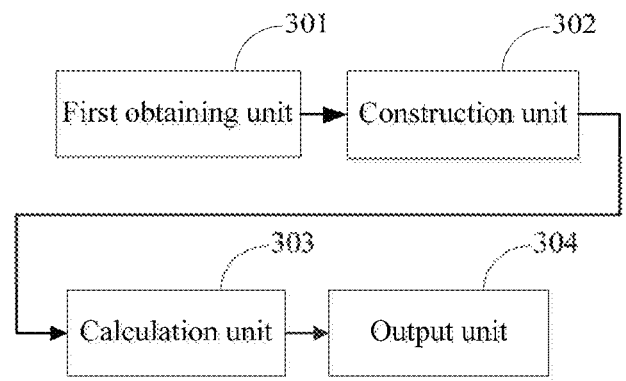
FIG. 3 is a schematic structural diagram of a data processing apparatus for a virtual resource according to an embodiment of this application.

Referring to FIG. 3, FIG. 3 is a schematic structural diagram of a data processing apparatus for a virtual resource according to an embodiment of this application. The apparatus may include a first obtaining unit 301, a construction unit 302, a calculation unit 303, and an output unit 304.

The first obtaining unit 301 is configured to obtain data related to a virtual resource transfer between at least two virtual resource accounts.

In this embodiment, an account hosting products such as Q coins and Q points, bills, and game props and services that are bought by a user is referred to as a virtual resource account. In a relational network such as a social network or a payment network, all of bank transfers and payment by account, virtual currency (for example, Q coins) recharge, purchase of an entertainment item (for example, QQ game props), or payment for an application service (for example, account upgrade or membership application) may be considered as data related to a virtual resource transfer between virtual resource accounts.

The construction unit 302 is configured to construct a virtual resource transfer relationship chain between the virtual resource accounts according to the data.

For example, the construction unit 302 may include a first determining subunit, a second determining subunit, a third determining subunit, and a construction subunit.

(1) The first determining subunit is configured to determine a corresponding virtual resource account as a computing node according to an instruction in the data.

(2) The second determining subunit is configured to determine a service node having a virtual resource transfer association with the virtual resource account as a secondary node.

It may be understood that referring to FIG. 1c, FIG. 1c shows a virtual resource transfer relationship chain between two virtual resource accounts. The virtual resource transfer relationship chain is also referred to as a relationship chain network, and is a network including an interconnection relationship between association nodes. For example, the virtual resource transfer relationship chain may be specifically a property transfer relationship chain, and is used for representing a property transfer relationship such as purchase or presentation between virtual property accounts.

For example, the constructing a virtual resource transfer relationship chain may be specifically as follows:

First, a virtual resource account A (which may be referred to as an account A for short) and an account B are determined as computing nodes, and are represented by square frames. Service nodes having a virtual resource transfer association with the account A and the account B are determined as secondary node, and are represented by circle frames. For example, if the account A and the account B are defined as QB accounts, a monetary channel node, a game node, a monthly service node, and the like having a virtual resource transfer association with the accounts are determined as secondary nodes.

(3) The third determining subunit is configured to determine an edge between the computing node and the secondary node, the edge indicating a direction and a weight of a virtual resource transfer.

(4) The construction subunit is configured to construct a virtual resource transfer relationship chain according to the computing node, the secondary node, and the edge.

After the computing node and the secondary node are determined, the edge between the computing node and the secondary node is determined, where the edge may indicate a property transfer. An arrow of the edge represents the direction (including an inflow and an outflow) of the virtual resource transfer, and the weight of the edge represents an amount of transferred property or a quantity of property transfers. Finally, a directed graph (for example, FIG. 1c) may be constructed by using the computing node, the secondary node, and the edge according to a property transfer direction. In this embodiment, the directed graph is referred to as the virtual resource transfer relationship chain.

The calculation unit 303 is configured to calculate, based on the virtual resource transfer relationship chain, a similarity between the virtual resource accounts according to a preset calculation rule.

Before the calculating, based on the virtual resource transfer relationship chain, a similarity between the virtual resource accounts according to a preset calculation rule, related preprocessing may further be performed. The apparatus may further include:

(a) an initialization unit, configured to initialize a node hop count between the virtual resource accounts;

(b) a determining unit, configured to determine a target virtual account in the virtual resource accounts; and (c) a second obtaining unit, configured to obtain a direct association account that is in a direct virtual resource transfer association with the target virtual account.

For example, after a virtual resource transfer relationship chain is constructed, a similarity obtaining request input by a user is received; in obtained virtual resource accounts, a target virtual account specified by the user is determined according to the request; and a similarity between the target virtual account and an association account is calculated according to the virtual resource transfer relationship chain, so as to find an association account having a higher similarity with the target virtual account.

In this case, the calculation unit 303 may specifically include:

(A) a calculation subunit, configured to calculate, based on a relationship chain between the target virtual account and the direct association account, a similarity between the target virtual account and the direct association account according to the preset calculation rule, to obtain a direct similarity:

(B) a hop count control subunit, configured to progressively increase the node hop count between the virtual resource accounts;

(C) a calculation control subunit, configured to: when it is determined that a value of a node hop count obtained after the progressive increase is less than a preset threshold, obtain a corresponding first association account according to the value of the node hop count obtained after the progressive increase, the calculation control subunit, further configured to calculate a similarity between the target virtual account and the first association account according to the direct similarity, and trigger the hop count control subunit to progressively increase the node hop count between the virtual resource accounts, until a value of a node hop count obtained after the progressive increase reaches the preset threshold.

The foregoing units are units having a processing function of calculating a similarity between the target virtual account and an account that is n (n is a positive integer greater than 0) hops away from the target virtual account. After the virtual resource transfer (for example, property transfer) relationship chain is constructed, an initialization operation of setting a hop count to 0 is performed. After the similarity between the target virtual account and the direct association account is calculated, the hop count is updated, and a similarity result is output after the hop count reaches the preset threshold.

It may be understood that in an example of a property transfer, a basic idea of similarity calculation is that more associated property between two virtual property accounts indicate a larger similarity between the accounts. A value of the similarity ranges from 0 to 1, 0 indicates being totally not similar, and 1 indicates being totally similar.

Steps of calculating a similarity may specifically include the following cases:

The calculation subunit calculates the similarity between the target virtual account and the direct association account, that is, calculates direct similarity between two directly associated accounts. In addition, the direct similarity between the two directly associated accounts may be calculated by using many methods, and the calculation subunit may be specifically configured to perform the following steps:

Case 1: For example, a similarity calculation rule in this case may be set as calculating a similarity without considering the weight of the edge. The calculation subunit may be specifically configured to: determine, based on the relationship chain between the target virtual account and the direct association account, an intersection set of a set of secondary nodes of the target virtual account and a set of secondary nodes of the direct association account, and a union set of the set of the secondary nodes of the target virtual account and the set of the secondary nodes of the direct association account; and determine the similarity between the target virtual account and the direct association account according to a quantity of nodes in the intersection set and a quantity of nodes in the union set, to obtain the direct similarity.

Case 2: For another example, based on Case 1, a direction condition may be limited when a secondary node associated with an account is extracted. The calculation subunit may be specifically configured to: determine, based on a direction of a virtual resource transfer indicated by the relationship chain between the target virtual account and the direct association account, an intersection set of a set of secondary nodes that are in the same transfer direction and that are of the target virtual account and a set of secondary nodes that are in the same transfer direction and that are of the direct association account, and a union set of the set of the secondary nodes that are in the same transfer direction and that are of the target virtual account and the set of the secondary nodes that are in the same transfer direction and that are of the direct association account; and determine the similarity between the target virtual account and the direct association account according to a quantity of nodes in the intersection set and a quantity of nodes in the union set, to obtain the direct similarity.

Case 3: For still another example, a similarity calculation rule in this case may be set as calculating a similarity by considering the weight of the edge. The calculation subunit may be specifically configured to: determine, based on the relationship chain between the target virtual account and the direct association account, a common secondary node of the target virtual account and the direct association account;

obtain a first total weight according to a weight between the target virtual account and the common secondary node and a weight between the direct association account and the common secondary node; and obtain a second total weight according to a weight between the target virtual account and a secondary node corresponding to the target virtual account and a weight between the direct association account and a secondary node corresponding to the direct association account; and determine the similarity between the target virtual account and the direct association account according to the first total weight and the second total weight, to obtain the direct similarity.

It may be understood that based on Case 3, a direction condition may also be limited when a secondary node is extracted. For details, refer to Case 2, and details are not described herein again.

Further, the calculation control subunit calculates the similarity between the target virtual account and the first association account according to the direct similarity, that is, calculates a similarity between the target virtual account and a first association account between which a hop count exists.

For example, in an implementation, the similarity may be calculated by using a similarity propagation algorithm. That is, two accounts may be in a property association with another account to generate similarity propagation. Specifically, the target virtual account is in a virtual resource transfer association with the first association account by using the direct association account, and the calculation control subunit may be specifically configured to:

calculate, based on a relationship chain between the direct association account and the first association account, a similarity between the direct association account and the corresponding first association account, to obtain a first similarity; and calculate the similarity between the target virtual account and the first association account according to the direct similarity and the first similarity.

For another example, in an implementation, the similarity may be calculated by using a similarity overlap and add algorithm. That is, two accounts may be associated by using multiple methods, and similarities generated by using the methods may be overlapped and added to serve as a final similarity between the two accounts. Specifically, the direct association account includes the first association account (that is, the corresponding first association account obtained according to the value of the node hop count obtained after the progressive increase) and a second association account, the target virtual account is in a virtual resource transfer association with the first association account by using the second association account, and the target virtual account is in a direct virtual resource transfer association with the first association account; and the calculation control subunit may be specifically configured to:

determine a direct similarity between the target virtual account and the second association account as a first direct similarity, and determine a direct similarity between the target virtual account and the first association account as a second direct similarity; and calculate, based on a relationship chain between the second association account and the first association account, a similarity between the second association account and the first association account, to obtain a third direct similarity, and determine the similarity between the target virtual account and the first association account according to the first direct similarity, the second direct similarity, and the third direct similarity.

The output unit 304 is configured to output, according to the calculated similarity, a corresponding similarity and a virtual resource account that satisfies a preset condition.

It may be understood that the output unit 304 may be specifically configured to:

determine, according to the calculated similarity, an association account corresponding to a similarity that is between the association account and the target virtual account and that is greater than a preset similarity, and outputting the association account and the corresponding similarity; or arrange the similarity in a descending order, determining, based on the arrangement, an association account satisfying a preset arrangement range, and outputting the association account and a corresponding similarity, for example, outputting N association accounts of which similarities rank first and the similarities of the accounts.

During specific implementation, the above units may be implemented as separate entities, or may be combined in any way and implemented as one or several entities. For the specific implementation of the above units, reference may be made to the above method embodiments, and details are omitted herein.

The data processing apparatus for a virtual resource may be specifically integrated in a network device such as a server or a gateway.

It can be learned from the foregoing descriptions that according to the data processing apparatus for a virtual resource provided in this embodiment, data related to a virtual resource transfer between multiple virtual resource accounts is obtained, a virtual resource transfer relationship chain between the virtual resource accounts is constructed according to the data, a similarity between the virtual resource accounts is calculated according to the virtual resource transfer relationship chain and a preset calculation rule, and a corresponding similarity and a virtual resource account that satisfies a preset condition are output. Independent virtual resource transfer data of each virtual resource account is analyzed to construct a virtual resource transfer relationship chain, so that a similarity may be calculated by using an association relationship between the accounts. This, compared with a manner of calculating a similarity by extracting a feature vector from each account, can significantly reduce a calculated amount for the similarity, thereby reducing consumption of a server and improving efficiency. Further, a searching range of a similar account is purposely extended by using propagation and additivity of a similarity, to obtain a more accurate calculation result.

Figure 4:
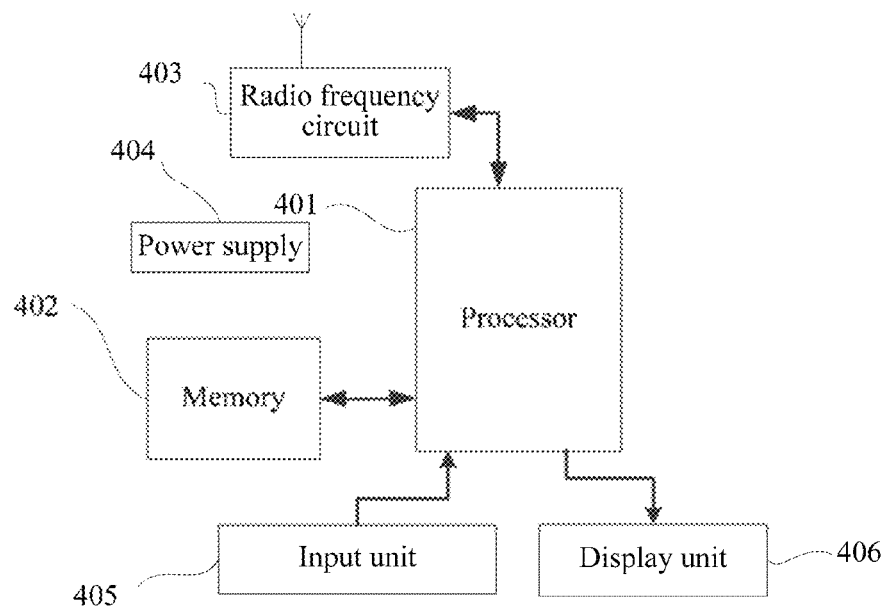
FIG. 4 is a schematic structural diagram of a server according to this application.

An embodiment of this application further provides a server that may integrate the data processing apparatus for a virtual resource according to the embodiments of this application. As shown in FIG. 4, FIG. 4 is a schematic structural diagram of the server according to this embodiment of this application.

The server may include parts such as a processor 401 including one or more processing cores, a memory 402 including one or more computer readable storage media, a radio frequency (Radio Frequency, RF) circuit 403, a power supply 404, an input unit 405, and a display unit 406. A person skilled in the art may understand that the server structure shown in FIG. 4 does not constitute a limit to the server. The server may include more or fewer parts than those shown in the figure, may combine some parts, or may have different part arrangements.

The processor 401 is a control center of the server, and is connected to various parts of the entire server by using various interfaces and lines. By running or executing a software program and/or module stored in the memory 402, and invoking data stored in the memory 402, the processor 401 executes various functions of the server and performs data processing, thereby monitoring the entire server. Optionally, the processor 401 may include one or more processing cores. The processor 401 may integrate an application processor and a modem. The application processor mainly processes an operating system, a user interface, an application program, and the like. The modem mainly processes wireless communication. It may be understood that the foregoing modem may not be integrated into the processor 401.

The memory 402 may be configured to store a software program and module. The processor 401 executes various function applications and performs data processing by running the software program and module stored in the memory 402. The memory 402 may mainly include a program storage area and a data storage area. The program storage area may store an operating system, an application program required by at least one function (such as a sound playing function and an image display function), and the like. The data storage area may store data created according to use of the server, and the like. In addition, the memory 402 may include a high speed random access memory, and may also include a non-volatile memory such as at least one magnetic disk storage device, a flash memory, or another volatile solid-state storage device. Correspondingly, the memory 402 may further include a memory controller, to provide access of the processor 401 to the memory 402.

The RF circuit 403 may be configured to receive and send a signal during an information transmission and receiving. Especially, the RF circuit 403 sends, after receiving downlink information of a base station, the information to one or more processors 401 for processing, and sends involved uplink data to the base station. Generally, the RF circuit 403 includes but is not limited to an antenna, at least one amplifier, a tuner, one or more oscillators, a subscriber identity module (SIM) card, a transceiver, a coupler, a low noise amplifier (LNA, Low Noise Amplifier), a duplexer, and the like. In addition, the RF circuit 403 may further communicate with a network and another device by means of wireless communication. The wireless communication may use any communications standard or protocol, which includes but is not limited to, Global System for Mobile Communications (GSM, Global System for Mobile communications), General Packet Radio Service (GPRS. General Packet Radio Service), Code Division Multiple Access (CDMA, Code Division Multiple Access), Wideband Code Division Multiple Access (WCDMA, Wideband Code Division Multiple Access), Long Term Evolution (LTE, Long Term Evolution), e-mail, Short Message Service (SMS, Short Message Service), and the like.

The server further includes the power supply 404 (for example, a battery) that supplies power to each component. The power supply may be logically connected to the processor 401 by using a power supply management system, so that functions such as management of charging, discharging, and power consumption are implemented by using the power supply management system. The power supply 404 may further include any component such as one or more direct current power supplies or alternating current power supplies, a recharging system, a power supply fault detection circuit, a power converter or a power inverter, or a power status indicator.

The server may further include the input unit 405. The input unit 405 may be configured to receive entered numeric or character information and generate keyboard, mouse, joystick, optical, or trackball signal input related to user settings and function control.

The server may further include the display unit 406. The display unit 406 may be configured to display information entered by the user or information provided to the user, and graphical user interfaces of the server. The graphical user interfaces each may include an image, text, an icon, a video, or any combination thereof. The display unit 406 may include a display panel. Optionally, the display panel may be configured in a form of a liquid crystal display (LCD, Liquid Crystal Display), an organic light-emitting diode (OLED, Organic Light-Emitting Diode), or the like.

Specifically, in this embodiment, the processor 401 of the server may load, according to the following instructions, executable files corresponding to processes of one or more application programs into the memory 402. The processor 401 runs the application programs stored in the memory 402, to implement various functions as follows:

obtaining data related to a virtual resource transfer between at least two virtual resource accounts;

constructing a virtual resource transfer relationship chain between the virtual resource accounts according to the data;

calculating, based on the virtual resource transfer relationship chain, a similarity between the virtual resource accounts according to a preset calculation rule; and outputting, according to the calculated similarity, a corresponding similarity and a virtual resource account that satisfies a preset condition.

The processor 401 may be further configured to: determine a corresponding virtual resource account as a computing node according to an instruction in the data; determine a service node having a virtual resource transfer association with the virtual resource account as a secondary node; determine an edge between the computing node and the secondary node, the edge indicating a direction and a weight of a virtual resource transfer; and construct a virtual resource transfer relationship chain according to the computing node, the secondary node, and the edge.

The processor 401 may be further configured to: initialize a node hop count between the virtual resource accounts, determine a target virtual account in the virtual resource accounts; obtain a direct association account that is in a direct virtual resource transfer association with the target virtual account; calculate, based on a relationship chain between the target virtual account and the direct association account, a similarity between the target virtual account and the direct association account according to the preset calculation rule, to obtain a direct similarity; progressively increase the node hop count between the virtual resource accounts; and when it is determined that a value of a node hop count obtained after the progressive increase is less than a preset threshold, obtain a corresponding first association account according to the value of the node hop count obtained after the progressive increase, calculate a similarity between the target virtual account and the first association account according to the direct similarity, and trigger the hop count control subunit to progressively increase the node hop count between the virtual resource accounts, until a value of a node hop count obtained after the progressive increase reaches the preset threshold.

The processor 401 may be further configured to: determine, based on the relationship chain between the target virtual account and the direct association account, an intersection set of a set of secondary nodes of the target virtual account and a set of secondary nodes of the direct association account, and a union set of the set of the secondary nodes of the target virtual account and the set of the secondary nodes of the direct association account; and determine the similarity between the target virtual account and the direct association account according to a quantity of nodes in the intersection set and a quantity of nodes in the union set, to obtain the direct similarity.

The processor 401 may be further configured to: determine, based on a direction of a virtual resource transfer indicated by the relationship chain between the target virtual account and the direct association account, an intersection set of a set of secondary nodes that are in the same transfer direction and that are of the target virtual account and a set of secondary nodes that are in the same transfer direction and that are of the direct association account, and a union set of the set of the secondary nodes that are in the same transfer direction and that are of the target virtual account and the set of the secondary nodes that are in the same transfer direction and that are of the direct association account; and determine the similarity between the target virtual account and the direct association account according to a quantity of nodes in the intersection set and a quantity of nodes in the union set, to obtain the direct similarity.

The processor 401 may be further configured to: determine, based on the relationship chain between the target virtual account and the direct association account, a common secondary node of the target virtual account and the direct association account; obtain a first total weight according to a weight between the target virtual account and the common secondary node and a weight between the direct association account and the common secondary node; obtain a second total weight according to a weight between the target virtual account and a secondary node corresponding to the target virtual account and a weight between the direct association account and a secondary node corresponding to the direct association account; and determine the similarity between the target virtual account and the direct association account according to the first total weight and the second total weight, to obtain the direct similarity.

The processor 401 may be further configured to: calculate, based on a relationship chain between the direct association account and the first association account, a similarity between the direct association account and the corresponding first association account, to obtain a first similarity; and calculate the similarity between the target virtual account and the first association account according to the direct similarity and the first similarity.

The processor 401 may be further configured to: determine a direct similarity between the target virtual account and the second association account as a first direct similarity; determine a direct similarity between the target virtual account and the first association account as a second direct similarity; calculate, based on a relationship chain between the second association account and the first association account, a similarity between the second association account and the first association account, to obtain a third direct similarity; and determine the similarity between the target virtual account and the first association account according to the first direct similarity, the second direct similarity, and the third direct similarity.

The processor 401 may be further configured to: determine, according to the calculated similarity, an association account corresponding to a similarity that is between the association account and the target virtual account and that is greater than a preset similarity, and outputting the association account and the corresponding similarity; or arrange the similarity in a descending order, determining, based on the arrangement, an association account satisfying a preset arrangement range, and outputting the association account and a corresponding similarity.

In the foregoing embodiments, a particular emphasis is laid on the description of each embodiment. For a part that is not detailed in an embodiment, refer to the detailed descriptions in the data processing method for a virtual resource. Details are not described herein.

The data processing apparatus for a virtual resource provided in the embodiments of this application may be, for example, a computer, a tablet computer, a mobile phone having a touch screen function. The data processing apparatus for a virtual resource and the data processing method for a virtual resource in the foregoing embodiments belong to a same concept, and any method provided in the embodiments of the data processing method for a virtual resource may be performed by using the data processing apparatus for a virtual resource. For a specific implementation process, refer to the embodiments of the data processing method for a virtual resource. Details are not described herein.

It is noted that for the data processing method for a virtual resource in this application, an ordinary tester in the art may understand that all or some processes of the data processing method for a virtual resource in the embodiments of this application may be implemented and completed by a computer program controlling related hardware. The computer program may be stored in a computer readable storage medium, for example, stored in a memory of a terminal, and is executed by at least one processor of the terminal. An execution process may include the processes in the embodiments of the data processing method for a virtual resource. The storage medium may be a magnetic disk, an optical disc, a read-only memory (ROM, Read-Only Memory), a random access memory (RAM, Random Access Memory), or the like.

For the data processing apparatus for a virtual resource in the embodiments of this application, various functional modules may be integrated in a processing chip, or each of the modules may exist alone physically, or two or more modules are integrated into one module. The integrated module may be implemented in a form of hardware, or may be implemented in a form of a software functional unit. When the integrated module is implemented in a form of a software functional module and sold or used as an independent product, the module may be stored in a computer readable storage medium. The storage medium may be, for example, a read-only memory, a magnetic disk, or an optical disc.

The data processing method and apparatus for a virtual resource provided in the embodiments of this application are described above in detail. This specification explains the principles and implementations of this application by using specific examples. The description of the foregoing embodiments are merely intended to help understand the method of this application and the core idea of this application. In addition, a person skilled in the art may make some variations in specific implementations and application scopes according to the idea of this application. Therefore, this specification shall not be understood as a limitation to this application.

What is claimed is:

1. A data processing apparatus, comprising:
    interface circuitry configured to obtain data related to at least two resource accounts and a resource transfer of the at least two resource accounts; and
    processing circuitry configured to:
        construct resource transfer relationships of the at least two resource accounts according to the data, the construction of the resource transfer relationships including the processing circuitry being configured to:
            set up a plurality of commuting nodes corresponding to the at least two resource accounts;
            set up a plurality of secondary nodes corresponding to services associated with the resource transfer of the at least two resource accounts;
            configure edges between the plurality of commuting nodes and the plurality of secondary nodes to be indicative of the resource transfer;
            generate a directed graph corresponding to the resource transfer relationships, the directed graph including the plurality of commuting nodes, the plurality of secondary nodes, and the edges; and
            determine the resource transfer relationships according to the directed graph;
        initialize a hop count;
        determine a target account from the at least two resource accounts;
        determine a direct association account that is in a direct resource transfer relationship with the target account, the direct resource transfer relationship having the initialized hop count between the target account and the direct association account;
        calculate, based on the resource transfer relationships determined from the directed graph, a direct similarity measurement between the target account and the direct association account according to a preset calculation rule;
        determine an indirect association account having an increased hop count to the target account via the direct association account;
        calculate an indirect similarity measurement between the target account and the indirect association account based on the direct similarity measurement; and
        output, according to the calculated direct and indirect similarity measurements, a resource account with a similarity measurement satisfying a preset condition, the output resource account being different than the at least two resource accounts, the similarity measurement, satisfying the preset condition, providing a likelihood that the output resource account and the at least two resource accounts are owned by a same user.

2. The data processing apparatus according to claim 1, wherein
    the processing circuitry is configured to:
        determine, based on the resource transfer relationships determined from the directed graph, a first set of the plurality of secondary nodes having the resource transfer with the target account and a second set of the plurality of secondary nodes having the resource transfer with the direct association account;
        determine an intersection set of the first set of the plurality of secondary nodes and the second set of the plurality of secondary nodes;
        determine a union set of the first set of the plurality of secondary nodes and the second set of the plurality of secondary nodes; and
        calculate the direct similarity measurement between the target account and the direct association account according to a quantity ratio of the intersection set to the union set.

3. The data processing apparatus according to claim 1, wherein
    the processing circuitry is configured to:
        determine, based on the resource transfer relationships determined from the directed graph, a first set of the plurality of secondary nodes having the resource transfer in a direction towards the target account in the directed graph and a second set of the plurality of secondary nodes having the resource transfer in a direction towards the direct association account in the directed graph;
        determine an intersection set of the first set of the plurality of secondary nodes and the second set of the plurality of secondary nodes;
        determine a union set of the first set of the plurality of secondary nodes and the second set of the plurality of secondary nodes; and
        calculate the direct similarity measurement between the target account and the direct association account according to a quantity ratio of the intersection set to the union set.

4. The data processing apparatus for according to claim 1, wherein
    the processing circuitry is configured to:
        determine common secondary nodes from the plurality of secondary nodes having the resource transfer with both the target account and the direct association account;
        calculate a first total weight of a first weight sum between the target account and the common secondary nodes from the plurality of secondary nodes and a second weight sum between the direct association account and the common secondary nodes from the plurality of secondary nodes;

calculate a second total weight of first weights between the target account and the common secondary nodes from the plurality of secondary nodes of the target account and second weights between the direct association account and the common secondary nodes from the plurality of secondary nodes of the direct association account; and calculate the direct similarity measurement between the target account and the direct association account according to a ratio of the first total weight to the second total weight.

5. The data processing apparatus for according to claim 1, wherein the target account has the resource transfer to the indirect association account via the direct association account, and the processing circuitry is configured to:

calculate, based on the resource transfer relationships determined from the directed graph, a first similarity measurement between the direct association account and the indirect association account; and calculate the indirect similarity measurement between the target account and the indirect association account according to the direct similarity measurement and the first similarity measurement.

6. The data processing apparatus for according to claim 1, wherein the target account has a direct association with a first account and a second account, and an indirect association with the first account via the second account, and the processing circuitry is configured to:

calculate a first direct similarity measurement between the target account and the second account;

calculate a second direct similarity measurement between the target account and the first account;

calculate a third direct similarity measurement between the first account and the second account; and determine a similarity measurement between the target account and the first account according to a combination of the first direct similarity measurement, the second direct similarity measurement, and the third direct similarity measurement.

7. The data processing apparatus according to claim 1, wherein the preset condition is satisfied when the output resource account has a similarity measurement greater than a threshold.

8. A method for data processing by a data processing apparatus, the method comprising:

obtaining, by interface circuitry of the data processing apparatus, data related to at least two resource accounts and related to a resource transfer of the at least two resource accounts;

constructing resource transfer relationships of the at least two resource accounts according to the data, the construction of the resource transfer relationships including:

setting up a plurality of commuting nodes corresponding to the at least two resource accounts;

setting up a plurality of secondary nodes corresponding to services associated with the resource transfer of the at least two resource accounts;

configuring edges between the plurality of commuting nodes and the plurality of secondary nodes to be indicative of the resource transfer;

generating a directed graph corresponding to the resource transfer relationships, the directed graph including the plurality of commuting nodes, the plurality of secondary nodes, and the edges; and determining the resource transfer relationships according to the directed graph;

initializing a hop count;

determining a target account from the at least two resource accounts;

determining a direct association account that is in a direct resource transfer relationship with the target account, the direct resource transfer relationship having the initialized hop count between the target account and the direct association account;

calculating, based on the resource transfer relationships determined from the directed graph, a direct similarity measurement between the target account and the direct association account according to a preset calculation rule;

determining an indirect association account having an increased hop count to the target account via the direct association account;

calculating an indirect similarity measurement between the target account and the indirect association account based on the direct similarity measurement; and outputting, according to the calculated direct and indirect similarity measurements, a resource account with a similarity measurement satisfying a preset condition, the output resource account being different than the at least two resource accounts, the similarity measurement, satisfying the preset condition, providing a likelihood that the output resource account and the at least two resource accounts are owned by a same user.

9. The method according to claim 8, wherein the calculating, based on the resource transfer relationships determined from the directed graph, the direct similarity measurement between the target account and the direct association account according to the preset calculation rule further comprises:

determining, based on the resource transfer relationships determined from the directed graph, a first set of the plurality of secondary nodes having the resource transfer with the target account and a second set of the plurality of secondary nodes having the resource transfer with the direct association account;

determining an intersection set of the first set of the plurality of secondary nodes and the second set of the plurality of secondary nodes;

determining a union set of the first set of the plurality of secondary nodes and the second set of the plurality of secondary nodes; and calculating the direct similarity measurement between the target account and the direct association account according to a quantity ratio of the intersection set to the union set.

10. The method according to claim 8, wherein the calculating, based on the resource transfer relationships determined from the directed graph, the direct similarity measurement between the target account and the direct association account according to the preset calculation rule further comprises:

determining, based on the resource transfer relationships determined from the directed graph, a first set of the plurality of secondary nodes having the resource transfer in a direction towards the target account in the directed graph and a second set of the plurality of secondary nodes having the resource transfer in a direction towards the direct association account in the directed graph;

determining an intersection set of the first set of the plurality of secondary nodes and the second set of the plurality of secondary nodes;

determining a union set of the first set of the plurality of secondary nodes and the second set of the plurality of secondary nodes; and calculating the direct similarity measurement between the target account and the direct association account according to a quantity ratio of the intersection set to the union set.

11. The method according to claim 8, wherein the calculating, based on the resource transfer relationships determined from the directed graph, the direct similarity measurement between the target account and the direct association account according to the preset calculation rule further comprises:

determining common secondary nodes from the plurality of secondary nodes having the resource transfer with both the target account and the direct association account;

calculating a first total weight of a first weight sum between the target account and the common secondary nodes from the plurality of secondary nodes and a second weight sum between the direct association account and the common secondary nodes from the plurality of secondary nodes;

calculating a second total weight of first weights between the target account and the common secondary nodes from the plurality of secondary nodes of the target account and second weights between the direct association account and the common secondary nodes from the plurality of secondary nodes of the direct association account; and calculating the direct similarity measurement between the target account and the direct association account according to a ratio of the first total weight to the second total weight.

12. The method for according to claim 8, wherein the target account has the resource transfer to the indirect association account via the direct association account, and the method comprises:

calculating, based on the resource transfer relationships determined from the directed graph, a first similarity measurement between the direct association account and the indirect association account; and calculating the indirect similarity measurement between the target account and the indirect association account according to the direct similarity measurement and the first similarity measurement.

13. The method for according to claim 8, wherein the target account has a direct association with a first account and a second account, and an indirect association with the first account via the second account, and the method further comprises:

calculating a first direct similarity measurement between the target account and the second account;

calculating a second direct similarity measurement between the target account and the first account;

calculating a third direct similarity measurement between the first account and the second account; and determining a similarity measurement between the target account and the first account according to a combination of the first direct similarity measurement, the second direct similarity measurement, and the third direct similarity measurement.

14. The method according to claim 8, wherein the preset condition is satisfied when the output resource account has a similarity measurement greater than a threshold.

15. A non-transitory computer-readable medium storing instructions which when executed by a computer causes the computer to perform a method for data processing, the method comprising:

obtaining, data related to at least two resource accounts and related to a resource transfer of the at least two resource accounts;

constructing resource transfer relationships of the at least two resource accounts according to the data, the construction of the resource transfer relationships including:

setting up a plurality of commuting nodes corresponding to the at least two resource accounts;

setting up a plurality of secondary nodes corresponding to services associated with the resource transfer of the at least two resource accounts;

configuring edges between the plurality of commuting nodes and the plurality of secondary nodes to be indicative of the resource transfer;

generating a directed graph corresponding to the resource transfer relationships, the directed graph including the plurality of commuting nodes, the plurality of secondary nodes, and the edges; and determining the resource transfer relationships according to the directed graph;

initializing a hop count;

determining a target account from the at least two resource accounts;

determining a direct association account that is in a direct resource transfer relationship with the target account, the direct resource transfer relationship having the initialized hop count between the target account and the direct association account;

calculating, based on the resource transfer relationships determined from the directed graph, a direct similarity measurement between the target account and the direct association account according to a preset calculation rule;

determining an indirect association account having an increased hop count to the target account via the direct association account;

calculating an indirect similarity measurement between the target account and the indirect association account based on the direct similarity measurement; and outputting, according to the calculated direct and indirect similarity measurements, a resource account with a similarity measurement satisfying a preset condition, the output resource account being different than the at least two resource accounts, the similarity measurement, satisfying the preset condition, providing a likelihood that the output resource account and the at least two resource accounts are owned by a same user.

* * * * *